Figure 1:
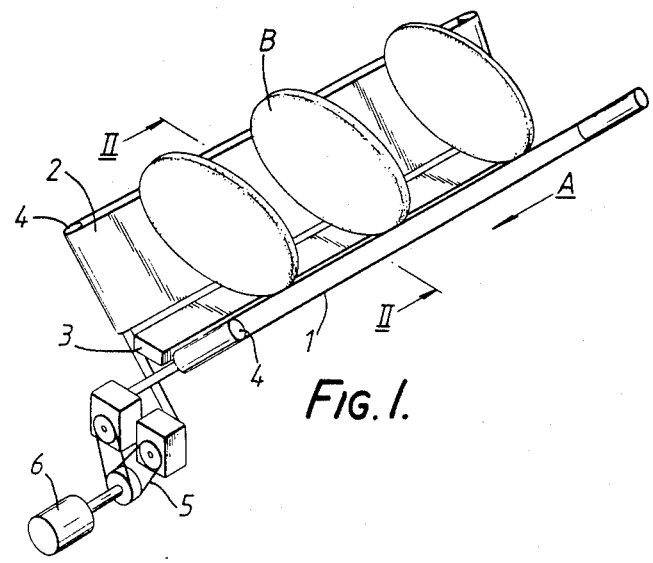

United States Patent [19]
Simmons

[11] Patent Number: 4,795,022
[45] Date of Patent: Jan. 3, 1989

[54] BISCUIT CONVEYOR

[75] Inventor: Robert J. Simmons, Llanyravon, Wales

[73] Assignee: Burtons Gold Metal Biscuits Limited, Cymbran, Wales

[21] Appl. No.: 6,861

[22] Filed: Jan. 27, 1987

[51] Int. Cl.⁴ ............................................. B65G 47/31
[52] U.S. Cl. .................... 198/462; 198/817; 414/798.2
[58] Field of Search ............... 198/462, 817, 626, 633, 198/461, 635; 414/37, 103, 104, 330

[56] References Cited

U.S. PATENT DOCUMENTS

| | | | |
|---|---|---|---|
| 2,394,795 | 2/1946 | Manspeaker | 198/635 |
| 3,538,992 | 11/1970 | Chauhan | 198/817 |
| 4,082,176 | 4/1978 | Pommer | 198/817 |
| 4,085,563 | 4/1978 | Egee et al. | 198/461 |
| 4,248,561 | 2/1981 | Graves | 198/817 |

FOREIGN PATENT DOCUMENTS

| | | | |
|---|---|---|---|
| 191731 | 8/1986 | European Pat. Off. | 198/633 |
| 1356384 | 6/1974 | United Kingdom | 198/462 |
| 2170164 | 7/1986 | United Kingdom . | |

Primary Examiner—Joseph E. Valenza
Attorney, Agent, or Firm—Scrivener and Clarke

[57] ABSTRACT

A conveyor system for transporting relatively planar articles such as biscuits, includes a pair of upwardly divergent conveyor walls formed by belts 1, 2 which extend on either side of a stationary element which can be a single member 3 or lips. An article such as a biscuit is normally transported by point contacts with the conveyor walls. If an obstruction is encountered the article pivots to assume a stationary, substantially upright position resting on the stationary element with very little pressure being imposed on it.

9 Claims, 3 Drawing Sheets

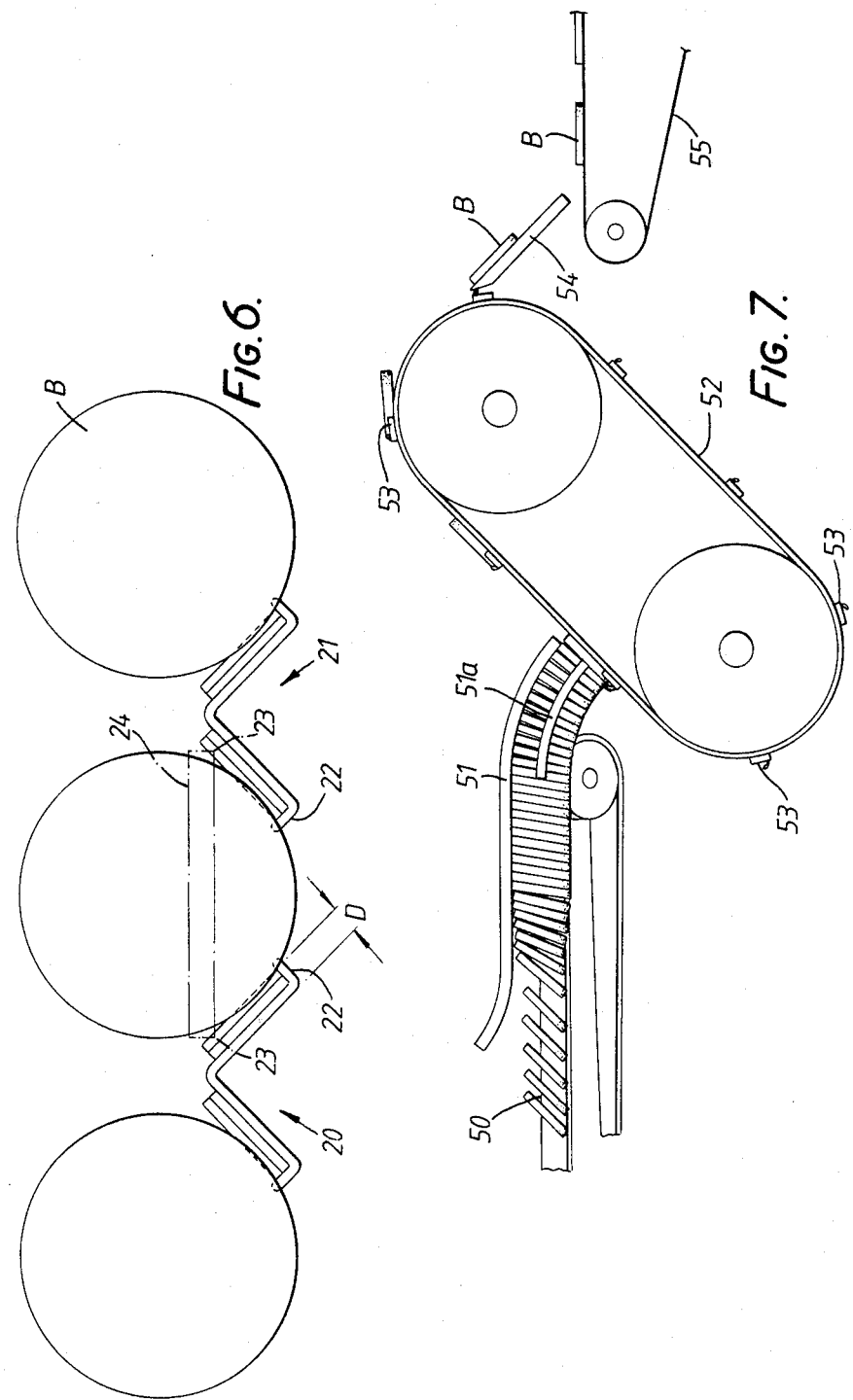

BISCUIT CONVEYOR

The present invention concerns a conveyor system for conveying articles which are relatively flat. In particular the invention is concerned with conveying biscuits from a baking station to a stacking and packaging station. However there are many other potential applications such as transporting lids for attachment to cans in a canning factory.

A major problem when conveying large numbers of fragile articles is either the occurrence of a blockage preventing free flow or intermittent interruption of the flow to enable stacking and packaging of the articles. With known conveyor systems this leads to a build up of pressure on the articles. Biscuits, for example, are extremely ill suited to withstand such pressure. Thus with soft biscuits such as digestives even the most advanced known conveying, stacking and packaging systems lead to a high proportion of broken and rejected biscuits.

It has been proposed to solve these problems by using conveyor systems which are entirely vibratory. However these are very expensive as many vibrators are needed, for example one vibrator for every two feet of conveyor. As the conveyor may be up to 100 feet long and many belts wide the expense of such a system is readily apparent.

For conveying biscuits it is proposed in U.K. patent specification No. 1042884 to provide a pair of driven spaced parallel endless wire conveyors to receive and support biscuits on the upper surfaces of the wire conveyors and to provide an endless driven belt conveyor, narrower than the spacing between the wire conveyors, whose upper face is set a distance below the level of the uppermost part of each wire, that distance being small in relation to the distance between the wires. Fixed guides centralise the biscuits on the wire conveyors. The wire conveyor carries the biscuits to a stationery support where they stack, the rearmost biscuit in the stack being inclined. As a biscuit meets the stack its forward part rides up the rear face of the rearmost biscuit in the stack causing the line contacts of the newly arriving biscuit to pivot on the wires until the rearmost part of that biscuit becomes supported on the belt conveyor. The stack passes on to, for example a wrapping station.

The use of endless band conveyors has been proposed in aligning fish, after removal of the fish heads, for the purpose of further treatment, the band conveyors having runs which face one another and over a part of those the faces being divergent to define an upwardly open V. The divergent part of the runs convey the fish by holding the body of each fish, head end forward to a pair of angular by displaceable members which actuate a fish guide mechanism for aligning the fish.

The present invention has for an object the provision of conveyor apparatus, and a method of conveying articles, which reduces the problems presented by the handling of biscuits.

According to the present invention there is provided a method of conveying generally planar articles which comprises positioning each article between upwardly divergent opposing faces of a pair of driven endless belt conveyors with the article inclined forwardly and upwardly in the direction of travel and pivotable on the point of contact of the article with each of the conveyor runs.

According to the present invention there is also provided apparatus for conveying generally planar articles which comprises at least one pair of conveyor runs having opposed faces which are upwardly divergent and each of which will pivotally support each article in an attitude forwardly and upwardly inclined in relation to the direction of travel of the runs, a support means being provided in respect of each pair of runs beneath the path of articles on the runs upon which the trailing edge of each article whose travel is obstructed will, upon pivoting, be supported.

Figure 2:
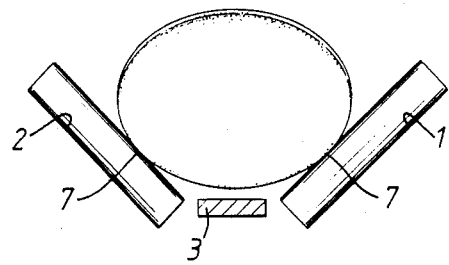
Figure 3:
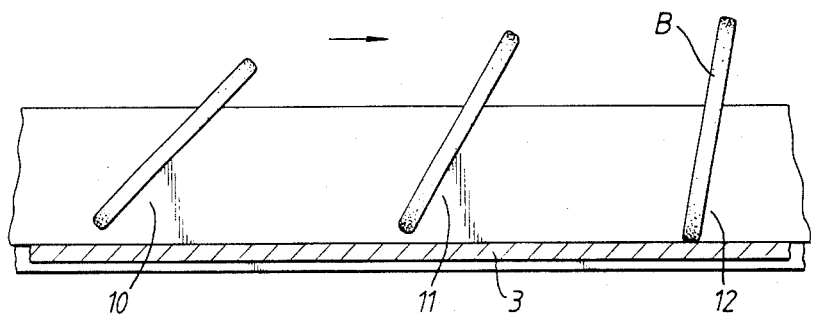
Figure 4:
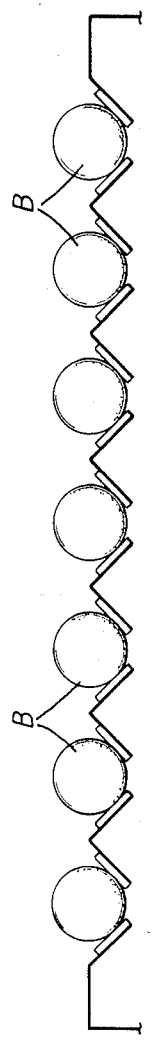
Figure 5:
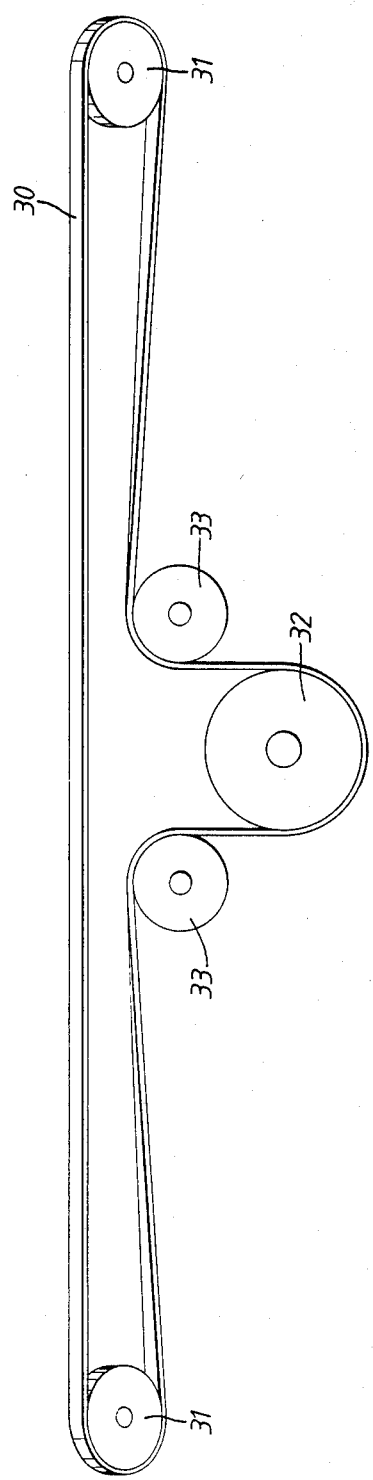

In order that the invention may be more clearly understood various embodiments thereof will now be described by way of example and with reference to the accompanying drawings, in which:

FIG. 1 is a perspective diagrammatic view of one embodiment of a conveying system according to the invention, FIG. 2 is a section on line II—II of FIG. 1 showing a biscuit being conveyed, FIG. 3 is a diagrammatic section showing different stages of the operation of the conveyor of FIG. 1, FIG. 4 is an end view of a series of parallel conveyors according to the invention, FIG. 5 is a perspective view of the drive system of one of the belts of FIG. 4, FIG. 6 shows some critical dimensions in relation to the size of articles being conveyed, and FIG. 7 shows stacking apparatus which can be used with the conveying apparatus of the preceding Figures.

In the drawings FIG. 1 shows a conveyor for circular biscuits and which comprises a pair of continuous conveyor belts 1 and 2. Belts 1 and 2 are inclined at 90 degree to one another and extend along opposite sides of a stationary element 3. The belts 1 and 2 are driven by drive rollers 4 to transport circular biscuits B in the direction of arrow A. Drive rollers 4 are in turn driven by a belt and reduction gearing arrangement 5 and electric motor 6.

As can be seen in FIG. 1 each biscuit B is inclined in the conveying direction with its leading edge higher than its trailing edge, the latter not contacting element 3. The biscuit is supported at point contacts 7 with the inner runs of the belt. Thus if the biscuit hits an obstruction it will pivot about its contact points until its trailing edge contacts element 3. This pivotal or tipping movement will continue until the stopped biscuit comes to rest in a vertical position standing on the element 3. In this manner it is subjected to virtually no pressure from the still moving conveyor belts.

FIG. 3 shows the sequence of attitudes of a biscuit B as it encounters an obstruction. For the sake of clarity the biscuit is shown in different positions along the conveyor. At point 10 the biscuit is travelling normally with its trailing edge above element 3. At 11 the biscuit encounters an obstruction which may be a previously stopped biscuit or a member for stopping biscuits prior to packaging. The obstruction causes the biscuit to pivot firstly to the attitude shown at 11 and finally to that at 12.

The angle at which the biscuit reaches equilibrium and at which a stack of obstructed biscuits is formed is dependent on the relative dimensions of the biscuit, the stationary element on which it sits in equilibrium and the angle of the conveyors to one another. The latter will normally be 90 degrees. FIG. 6 is an end view of two parallel conveyors runs 20 and 21. There may be many more such parallel runs as can be seen from FIG.

4. In the embodiment of FIG. 6 the element 3 is replaced by lips 22 projecting beyond the lower edges of belts 23. The distance marked D is important in setting the stack angle of the biscuits when they encounter an obstruction. It can also be seen that a horizontal biscuit 24 will touch the upper runs of the two conveyors, that is the distance between the uppermost edges of the runs is slightly greater than the diameter of the biscuits being conveyed.

FIG. 5 shows a drive system for a single conveyor belt. The belt is toothed on its non-product carrying side and runs over a pair of end pulleys 31 inclined at 45 degrees. The belt is driven by a main drive pulley 32 which is in turn driven by a suitable drive source such as an electric motor (not shown). The drive pulley 32 has a horizontal axis as do two idler pulleys 33 on either side of it.

FIG. 7 shows a conveyor belt as previously described delivering biscuits 50 to a stacking device which includes a top guide 51 and side guides 51a and a support not shown which deliver the stack along a downward incline to a short inclined belt conveyor 52 having a series of slats 53 which sequentially pass the stack and remove the leading biscuit presented to the conveyor 52. This conveyor carries each biscuit to a knife edge device 54 which detaches the biscuit from conveyor 52 and guides that biscuits under gravity to a next station, here shown as a further conveyor 55.

I claim:

1. A method of conveying generally planar articles which comprises positioning each article between upwardly divergent opposing faces of a pair of driven endless belt conveyors having a lateral spacing at their upper edges of a size that said articles cannot bridge said upper edges, an article, when positioned horizontally, being pivotable from that position on its points of contact with the respective conveyor runs, and placing an obstruction in the path of movement of said article on said belt conveyors to cause the article to pivot about said points of contact until the trailing lowermost region of said article is moved into contact with a support positioned below the path of the articles and the article is thereby freed substantially from the pressure of said conveyor belts thereon.

2. Apparatus for conveying generally planar articles comprising:
a first endless conveyor belt providing a first conveying surface;
a second endless conveyor belt providing a second conveying surface;
said first and second conveying surfaces being opposed and upwardly divergent so as to provide therebetween a path along which articles are, in use, conveyed, each such article being pivotally supported laterally on and between said conveying surfaces for pivotal movement about an axis perpendicular to the direction of said path between a generally horizontal position and an inclined position in which the article is inclined forwardly and upwardly with its leading edge above its trailing edge; the upper edges of the conveying surfaces of said belts being spaced apart laterally of said path a distance greater than the greatest lateral dimension of articles conveyed thereby so that said articles cannot bridge the upper edges of said belts;
and support means extending beneath said path and arranged so as to be contacted by the trailing edge of an article conveyed by the apparatus when its movement therealong is obstructed and said article thereby pivoted until it is supported by said support means substantially free of pressure from said conveyor belts.

3. Apparatus as claimed in claim 2, wherein said support means comprises a pair of elongated elements extending beneath said path, both being positioned to be contacted by the trailing edge of said article and to support the same upon pivoting thereof.

4. Apparatus as claimed in claim 3, wherein said elongated elements comprise a pair of lips, one in respect of each belt, each lip projecting inwardly from the lower edge of each of the respective belts.

5. Apparatus as claimed in claim 4, including a support underlying each belt to support the same, each of said lips being integral with a respective support.

6. Apparatus as claimed in claim 2, wherein said conveying means has an end region, means at said end region for stacking said articles as they are pivoted onto said support means, said stacking means having an outlet, and second conveyor means having a run passing in close adjacency to the outlet of said stacking means, said second conveyor means carrying a plurality of spaced members projecting from its surface so that as the second conveyor means moves past the outlet of said stacking means each member thereon engages one of said articles stacked by said stacking means and carries the article in an upwardly direction.

7. A conveyor system as claimed in claim 6, and further including a knife edged device for engaging each article carried by the second conveyor, and diverting each article so engaged on to a third conveyor.

8. Apparatus as claimed in claim 2, wherein said support means comprises a single element lying longitudinally of and between the lowermost portions of the opposed conveying surfaces.

9. Apparatus as claimed in claim 2, including a plurality of pairs of divergent conveying surfaces and support means in respect of each pair.

* * * * *